(12) United States Patent
Colasso et al.

(10) Patent No.: US 7,163,048 B2
(45) Date of Patent: Jan. 16, 2007

(54) AUTOMATIC MONITORING SYSTEM FOR THERMAL ENERGY STORAGE PLANTS

(76) Inventors: Francisco J. Colasso, 567 Parkwood La., Naples, FL (US) 34103; Darwin Crossa, 8287 Key Royal La., Apartment 1531, Naples, FL (US) 34119; Hugo Madrigal, 4911 Molokai Dr., Naples, FL (US) 34112

( * ) Notice: Subject to any disclaimer, the term of this patent is extended or adjusted under 35 U.S.C. 154(b) by 470 days.

(21) Appl. No.: 10/828,670

(22) Filed: Apr. 21, 2004

(65) Prior Publication Data

US 2005/0236137 A1   Oct. 27, 2005

(51) Int. Cl.
*F28D 1/06* (2006.01)

(52) U.S. Cl. .................. 165/11.1; 165/74; 165/86; 62/131

(58) Field of Classification Search .......... 165/11.1, 165/11.2, 72, 73, 74, 75, 86, 4, 10, 138, 902; 62/130, 131
See application file for complete search history.

(56) References Cited

U.S. PATENT DOCUMENTS

| | | | | |
|---|---|---|---|---|
| 1,847,844 A * | 3/1932 | McLaren | ................. | 62/384 |
| 2,722,108 A * | 11/1955 | Hailey | ................. | 62/383 |
| 2,918,925 A * | 12/1959 | Dopler | ................. | 134/108 |
| 3,312,079 A * | 4/1967 | Siebert | ................. | 62/130 |
| 4,088,183 A | 5/1978 | Anzai et al. | | |
| 4,117,882 A * | 10/1978 | Shurcliff | ................. | 165/11.1 |
| 4,551,982 A * | 11/1985 | Kocher et al. | ................. | 62/130 |
| 4,662,435 A * | 5/1987 | Bohlin | ................. | 165/74 |
| 4,865,073 A * | 9/1989 | Kocher | ................. | 137/412 |
| 4,934,150 A * | 6/1990 | Fessler | ................. | 62/59 |
| 4,971,139 A * | 11/1990 | Khattar | ................. | 165/86 |
| 5,046,551 A | 9/1991 | Davis et al. | | |
| 5,090,207 A | 2/1992 | Gilbertson et al. | | |
| 5,139,549 A | 8/1992 | Knodel et al. | | |
| 5,390,501 A | 2/1995 | Davis et al. | | |
| 5,467,812 A | 11/1995 | Dean et al. | | |
| 5,649,431 A * | 7/1997 | Schroeder, Jr. | ................. | 62/434 |
| 5,678,626 A | 10/1997 | Gilles | | |
| 6,044,650 A * | 4/2000 | Cook et al. | ................. | 62/130 |
| 6,185,483 B1 | 2/2001 | Drees | | |
| 6,298,676 B1 | 10/2001 | Osborne et al. | | |
| 6,415,615 B1 | 7/2002 | Osborne et al. | | |

FOREIGN PATENT DOCUMENTS

| | | |
|---|---|---|
| JP | 359077254 A | 5/1984 |
| JP | 362141435 A | 6/1987 |

* cited by examiner

*Primary Examiner*—Ljiljana Ciric
(74) *Attorney, Agent, or Firm*—The Livingdton Firm; Edward M. Livingston; Angela M. Miller

(57) ABSTRACT

An automatic monitoring system for thermal energy storage (TES) plants wherein a pilot ice tank (11) uses Archimedes' principle to determine the ice inventory level by measuring the resultant force (28) of the algebraic addition of the weight of the ice and the reaction of the water pushing the ice up with a force equal to the weight on the water displaced by the volume of the ice. The resultant force (28) applied on a pivoting arm (37) is transferred to a liquid filled bellow (19) and is transformed into hydraulic pressure. The instantaneous hydraulic pressure is transferred to a pressure transducer (21) which converts the hydraulic pressure into an electric current. The electric current is then sent as an electronic analog input to the central control panel (30) of the TES for analysis or display.

12 Claims, 4 Drawing Sheets

AUTOMATIC MONITORING SYSTEM FOR THERMAL ENERGY STORAGE PLANTS

BACKGROUND OF THE INVENTION

This invention relates monitoring systems for thermal energy storage (TES) plants, more specifically, an automatic monitoring system for TES plants wherein the system, when connected to a central control, acts as a pilot ice tank for the new and/or existing TES plants of all sizes and types to automatically and precisely monitor ice inventory to further improve efficiency and energy savings.

Immediate application of the invention relates to the capacity of the pilot ice tank to produce and relay to the central control of the TES information regarding available ice inventory in the TES on a realtime basis. This realtime ice inventory level tells the owner and/or operator of the TES how much cooling capacity is available in the main ice tanks at any given time.

Based on the information provided by the pilot ice tank, an owner or operator of the TES plant can create records to track ice inventory levels in the central control of the TES. These records will help the owner or operator to determine, despite variable ambient conditions and/or variations on water level on the main ice tanks, the best low and high ice inventory values to start and/or stop the operation of the chillers during an ice-making mode to achieve maximum efficiency of the TES operation. Maximum efficiency results in maximum energy conservation and minimum operational costs.

These records are also useful tools to corroborate and adjust along the useful life of the TES the best low and high ice inventory values to start and/or stop the chillers.

Realtime information regarding the ice inventory level in the main ice tanks is therefore essential to maximize the efficiency of the TES. Once the information is received at the central control, the ice inventory information is analyzed. Then, a decision is made as to whether to issue a command to either start the chillers during the ice making mode every time maximum efficiency ice inventory depletion level has been reached in the main TES ice tanks or to stop the chillers during the ice making mode when the maximum efficiency high ice inventory level has been reached on the main ice tanks of the TES.

Thermal energy storage (TES) plants are widely used as an energy conservation system in air conditioning and industrial processes. They have been used for cooling since the earliest days of mechanical refrigeration, initially and more specifically as an energy saving device in breweries. Recently, however, the concept has gained widespread exposure due the deregulation of energy rates and consequent changes in energy pricing policies. Utility companies are now using time-and-use rate schedules, attempting to encourage people to shift their electric demand to off-peak, low electrical demand periods of the day by raising daytime rates for energy consumption. Thus, in order to reduce energy costs, approximately five to ten thousand facilities in the United States and approximately five to eight thousand facilities in the rest of the world have switched to TES systems to air condition their buildings and to cool tools and manufactured parts in industrial processes.

The most basic TES cooling system is a chiller-based, closed loop system. Water is cooled by chillers during off-peak (less expensive) hours and stored in an insulated tank. During peak hours, the stored cool water is pumped to the air conditioning units in order to cool a facility. Thus, several benefits, both monetary and environmental, are achieved by using a TES system. More common TES systems accumulate ice instead of chilled water inside the tanks. Using ice in lieu of water allows the TES system to store the same amount of energy in a relatively smaller space.

Examples of facilities reaping the benefits of using TES systems include Florida Gulf Coast University in Fort Myers, Fla., which saves an estimated $11,000.00 per month on energy bills and the Centex building, a 180,000 square foot facility located in Dallas, Tex., which received a 99/100 rating by the Environmental Protection Agency's Energy Star Program in 2000.

A typical TES cooling system works by using an insulated tank (called a thermal energy storage tank) that contains a heat exchanger within the tank surrounded by water. During the off-peak hours (usually in the evening) the system is in the ice making mode, often referred to as the "off-peak" charge cycle. In this mode, a certain mixture of water and ethylene glycol is cooled by a chiller to a temperature below the freezing point of water and is circulated through the heat exchanger. Since the water/ethylene glycol solution is below freezing, the water surrounding the heat exchanger in the tank freezes. This process continues until a large percentage of the water in the tank is frozen solid. The percentage of water that should be frozen is specified by the tank manufacturer and determines the cooling capacity of each tank in terms of hours per cooling capacity (tons/hour).

During peak hours when energy costs are higher, usually during the day but always determined by hourly energy market costs, the process is reversed. The ice in the tanks thaws, thereby cooling the water-glycol solution now circulating through the air conditioning or industrial process system. The water-glycol solution then absorbs the energy from the building and its occupants or from an industrial process. This is known as the ice melting mode, also referred to as the "on-peak" discharge cycle.

Most current methods for monitoring, tracking and controlling ice inventory in the tanks of the TES are based on a calibrated electronic sensor permanently and hydraulically connected to the interior of the tank and installed inside a plastic tube externally attached to the tank. As the ice is made or thawed inside the tank, changes in the ice volume makes the water level in the tank go up and down, raising the water level as ice is made and lowering the water level as ice is thawed. As the water level changes inside the tank, the water level also changes inside the plastic tube at exactly the same pace and level as within the tank because the external plastic tube is permanently and hydraulically connected to the interior of the tank. Every change in water level inside the tank is therefore registered by the calibrated sensor inside the external plastic tube and converted by an electronic transducer into a digital or analog electronic signal sent to the TES central control as realtime data. The central control then displays the information as actual ice inventory percentage on the TES. the ice inventory information is used by the central control as previously described to start and/or stop the chillers in the ice making mode or as an indication of the cooling capacity available.

Another commonly used method to control the ice making process on a TES is by constantly monitoring the temperature of the water-glycol mixture returning from the tanks to the chillers. In this method, calibrated electronic sensors immersed in wells in the water-glycol mixture mainstream constantly read the temperature of the mixture and electronically send this information to the central control. The central control instantaneously and automatically translates the digital or analog signals from the sensors into Fahrenheit degrees. When the temperature of the mixture returning from the tanks equal a predetermined temperature setting on the central control, the chillers will stop. The central control settings to stop the chillers range from 26 to 28 degrees Fahrenheit. At that mixture temperature, the ice inventory in the tanks will be close to or at 100%.

Some external factors make these two monitoring systems inaccurate. The first system is inaccurate due to rainwater and high humidity affecting the internal water level, especially during the summer months. Despite best efforts to tightly seal the tanks, rainwater and humidity enter the tanks, causing the internal water level to rise. Subsequently, the level sensors in the plastic tubes will essentially be reading water levels not corresponding to actual ice inventory in the tanks. Thus, the sensors are relaying inaccurate information to the central control. During the dry season, water evaporation from the tanks will also lead to inaccurate ice inventory readings. Additionally, oftentimes the level sensors in the plastic tubes located outside the tanks go bad due to constant exposure to the elements.

The main causes for the inaccurate ice inventory level readings when using the second system are outdoor ambient temperature changes and temperature sensors failures. Inaccuracy in ice inventory level readings has a direct consequence: inefficiency.

Inaccuracy in ice inventory level readings risks not having air conditioning in a facility or no cooling available for an industrial process during the on peak hours of the day. In the occurrence of such an event, the owner has the option of running the chiller(s) during the on peak hours at great expense.

A third system measures the displacement of the heat exchanger and its supporting structure as the buoyancy of the ice lifts them up. Displacement is measured manually or electronically.

A fourth system positions a coil on springs and employs load cells to sense the uplifting force of the ice forming on the coils which are restrained from vertical movement.

Although accurate and reliable, the third and fourth systems include expensive, complicated to manufacture and difficult to install parts. Thus, cost, downtime and technical difficulties to adapt to existing TES have kept these systems out of the market.

Thus, there exists the need for a more accurate, economical and universal system and method to measure the amount of ice made and/or thawed on TES.

The relevant prior art includes the following patents:

| Patent No. (U.S. unless stated otherwise) | Inventor | Issue Date |
| --- | --- | --- |
| 5,090,207 | Gilbertson et al. | Feb. 25, 1992 |
| 5,467,812 | Dean et al. | Nov. 21, 1995 |
| 5,678,626 | Gilles | Oct. 21, 1997 |
| 5,390,501 | Davis | Feb. 21, 1995 |
| JP359077254A | Okada et al. | May 2, 1984 |
| JP362141435A | Takebayashi et al. | June 24, 1987 |
| 5,139,549 | Knodel et al. | Aug. 18, 1992 |
| 4,088,183 | Anzai et al. | May 9, 1978 |
| 6,185,483 B1 | Drees | Feb. 6, 2001 |
| 5,046,551 | Davis et al. | Sep. 10, 1991 |
| 6,298,676 | Osborne et al. | Oct. 9, 2002 |
| 6,415,615 | Osborne et al. | Jul. 9, 2002 |

SUMMARY OF THE INVENTION

The primary object of the present invention is to provide an automatic monitoring system for thermal energy storage plants that is accurate.

A further object of the present invention is to provide an automatic monitoring system for thermal energy storage plants that is affordable.

An even further object of the present invention is to provide an automatic monitoring system for thermal energy storage plants that is adaptable.

An even further object of the present invention is to provide an automatic monitoring system for thermal energy storage plants that can be applied to new and existing thermal energy storage plants, regardless of the manufacturer, type or model of each tank within the plant.

A further object of the present invention is to provide an automatic monitoring system for thermal energy storage plants that keeps an accurate ice inventory, also known as cooling capacity, available in the main ice tanks of the TES.

The present invention fulfills the above and other objects by providing a pilot ice tank that claims the use of Archimedes' principle to determine the ice inventory level. According to Archimedes' principle, a body immersed in a fluid is buoyed up by a force equal to the weight of the displaced fluid. Thus, the present invention determines the ice inventory level by measuring the resultant force of the algebraic addition of the weight of the ice and the reaction of the water pushing the ice up with a force equal to the weight on the water displaced by the volume of the ice. Other forces, such as the weight of the heat exchanger, pivoting arm and accessories, piping, etc. are compensated by the use of a counterweight.

More precisely, the pilot ice tank has a pivoting arm, a heat exchanger and a counterweight. The pivoting arm, preferably made of metal, is secured to the pilot tank and has the heat exchanger affixed thereon. The proximal end of the pivoting arm has counterweight arm affixed thereon with the counterweight arm having a means for securing the counterweight. When there is no ice within the tank, the pivoting arm is parallel to the ground. Because the pivoting arm is hinged to a pivoting arm crossbar, when ice is formed, an upward force is exerted on the pivoting arm.

The resultant force applied on the pivoting arm is then transferred to a liquid filled bellow or cylinder and is then transformed into hydraulic pressure. The instantaneous hydraulic pressure is then applied to a pressure transducer which converts the hydraulic pressure into an electric current. The electric current is then sent as an electronic analog input to the central control of the TES for analysis or display.

An alternate embodiment of the invention includes weighting refrigeration evaporators and low temperature devices where the humidity contained in the surrounding humid air ices up and requires periodical thawing in order to ensure proper operation of the evaporator or any other low temperature device. In this particular application, the water source to make the ice is the humidity from the surrounding humid air. As humidity condenses and freezes on the evaporator, the weight of the ice formed on the evaporator will eventually reach a certain predetermined value. Having reached this value, the weighting device signals the initiation of the sequence to thaw the ice formed on the evaporator or other low temperature device. The thawing process will end when the ice weight disappears from the weighting device register, such as a scale.

In both embodiments, the measurement device is electrically connected to a either a building automation system (BAS) of the facility, the central control of the TES or to the control circuitry of the industrial process management system.

Finally, note that the non-ice weights, that is the weight not associated with the ice inventory, is accounted for in both embodiments. With regards to the pilot ice tank of the first embodiment, the weight of the structural support of the heat exchanger, hoses and all other accessories is balanced and nullified by the action of a counterweight. With regards to the second embodiment, the weight of the evaporator or low temperature devices and its accessories will be input into the force-measuring device as a tare on the scale.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
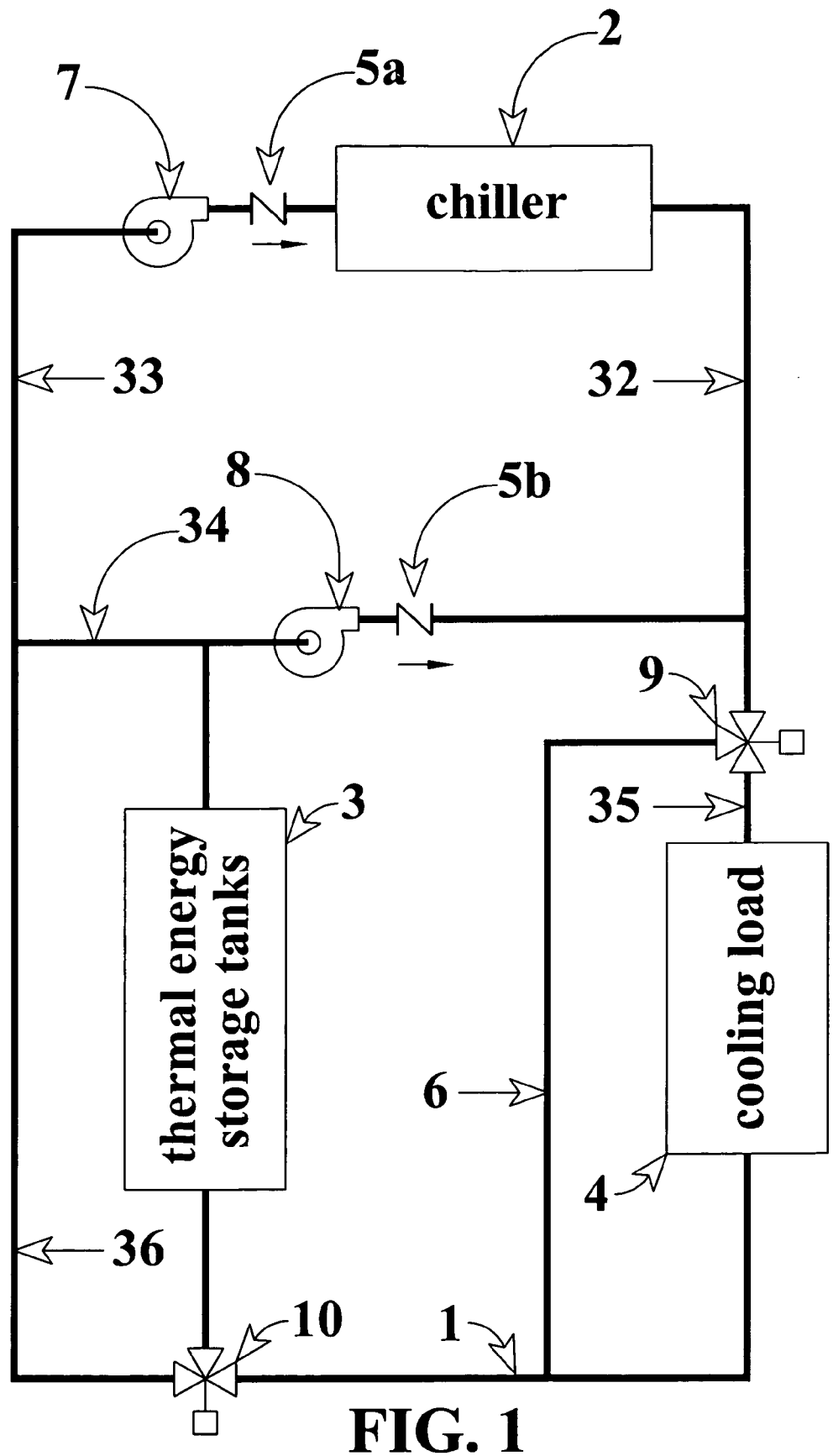
FIG. 1 is a schematic diagram of a closed loop thermal energy storage system.

For purposes of describing the preferred embodiment, the terminology used in reference to the numbered components in the drawings is as follows:
1. piping loop
2. chiller
3. thermal energy storage tanks
4. cooling load
5a. chiller check valve
5b. loop check valve
6. cooling load bypass piping
7. chiller pump
8. thermal energy storage tanks pump
9. cooling load three-way bypass valve
10. thermal energy storage tanks three-way bypass valve
11. pilot ice tank
12. proximal end of pivoting arm
13. distal end of pivoting arm
14. pivoting arm connecting u-bolts
15. pivoting arm crossbar
16. pivoting arm crossbar bearings
17. pivoting arm counterweight
18. hydraulic bellow support
19. hydraulic bellow
20. adjustable calibration rod
21. pressure transducer
22. heat exchanger heads
23. heat exchanger coil
24. heat exchanger inlet
25. heat exchanger outlet
26. hydraulic tubing
27. electric power source for pressure transducer
28. resultant force action
29. 10 VDC digital signal line
30. central control panel
31. analog/digital communication line
32. thermal energy storage plant
33. chiller entry piping
34. warmer pass loop section
35. cooling load entry piping
36. thermal energy storage tanks bypass piping
37. pivoting arm
38. counterweight arm With reference to FIG. 1, a schematic diagram of a closed loop thermal energy storage plant 32 is shown. During the ice making mode, which occurs during the nighttime or weekends off-peak hours, the chiller pump 7 circulates the chilled glycol/water solution through the piping loop 1 that passes the check valve 5a to enter the chiller 2 which lowers the solution temperature below water freezing point. Then, the solution passes through the cooling load three-way bypass valve 9 opened to the cooling load bypass piping 6, which reroutes the solution from entering the cooling load 4. The solution then continues through the piping loop 1, enters the thermal energy storage tanks three-way bypass valve 10, which is open to thermal energy storage tanks 3 wherein the heat exchangers cause the water within the tanks to freeze and form ice. Then, the solution passes through the warmer pass loop section 34, enters the chiller entry piping 33, where the cycle is started again. When enough ice is formed within the tanks 3, the system is turned off.

During the ice melting mode, which occurs during the on peak demand hours, the ice tank pump 8 circulates the solution through the loop check valve 5b to the cooling load three-way bypass valve 9 which is opened to the cooling load 4. The solution enters the cooling load entry piping 35 and enters the cooling load 4. The solution continues through the piping loop 1, through the thermal energy storage tanks three-way bypass valve 10 which is open to the thermal energy storage tanks 3 and ends at the thermal energy storage tanks pump 8. Because no energy is needed to run the chiller during the on peak hours when energy is most expensive, users will find that using thermal energy storage systems saves much money in utility costs.

Finally, during off peak hours of the day, the system runs on chiller mode. During chiller mode, the chiller pump 7 circulates the solution through piping loop 1 that passes through the chiller check valve 5a to the chiller 2, which lowers the solution to about 40 degrees Fahrenheit, continues through the cooling load three-way bypass valve 9 to the cooling load 4. The solution continues through the piping loop 1 to the thermal energy storage tanks three-way bypass valve 10, which is now opened to the ice tanks bypass piping 36, and continues to the chiller pump 7.

Figure 2:
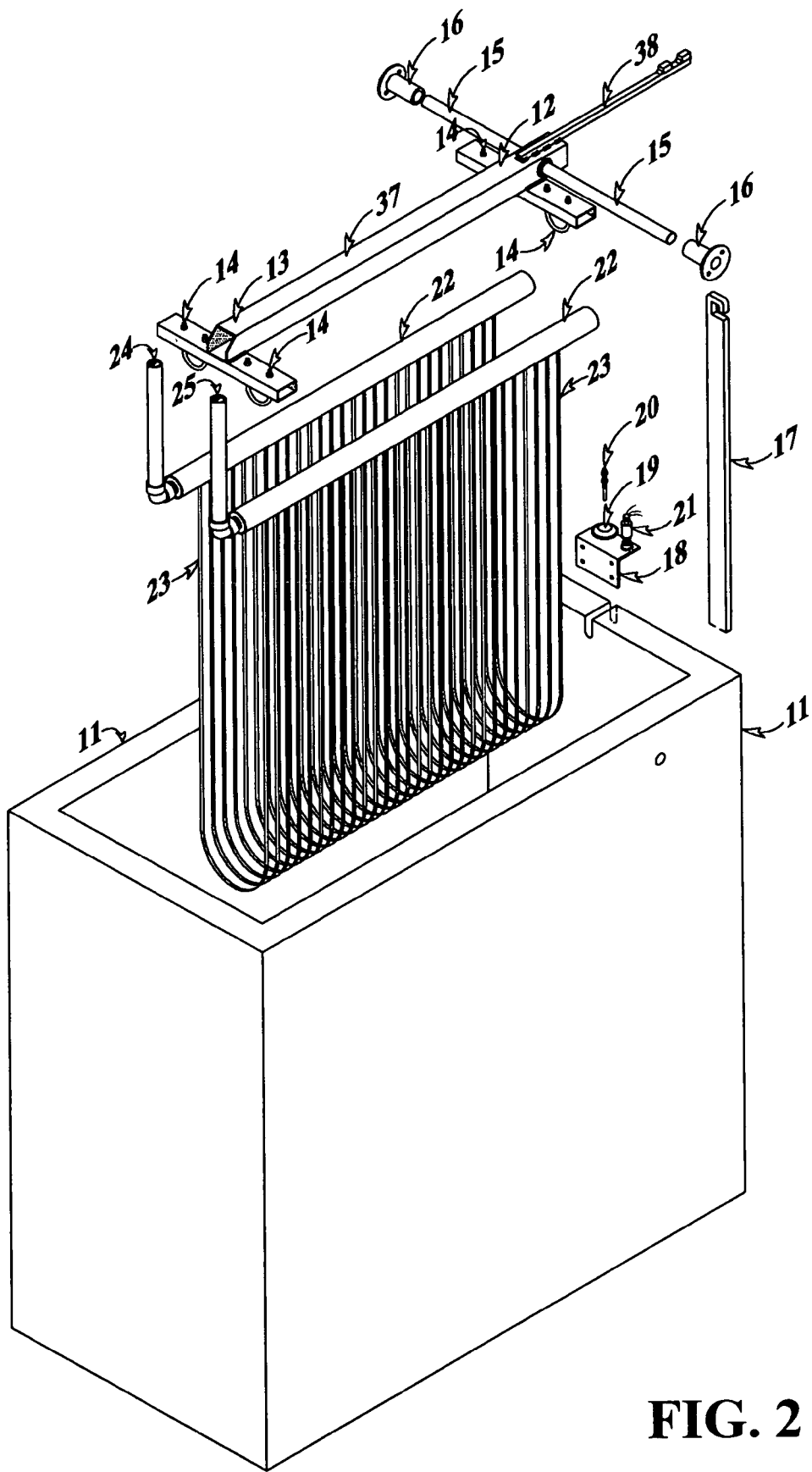
FIG. 2 is an exploded perspective view of a first embodiment of the present invention.

In FIG. 2, an exploded perspective view of a first embodiment of the present invention is shown. The pilot ice tank 11 has a pivoting arm 37 having a proximal end 12 and a distal end 13. Heat exchanger heads 22 having heat exchanger coils 23 are firmly attached to the proximal and distal ends of the pivoting arm 12 and 13 by a fastening means, preferably by using u-bolts 14, such that the heat exchanger inlet and outlet 24 and 25 are still exposed. Affixed to the proximal end of the pivoting arm 12 is a counterweight arm 38 wherein a counterweight 17 can be added. The pivoting arm crossbar 15 is mechanically affixed, preferably by welding, to the proximal end of the pivoting arm 12. Located on each end of the pivoting arm crossbar 15 are pivoting arm crossbar bearings 16, which permit the pivoting arm crossbar 15, heat exchanger heads 22 and attached heat exchanger coils 23 to be secured within the pilot ice tank 11.

The data collecting device, consisting namely of a hydraulic bellow support 18, a hydraulic bellow 19, an adjustable calibration rod 20 and a pressure transducer 21, are also shown. The hydraulic bellow support 18 is affixed to the outside of the pilot ice tank 11 to support the hydraulic bellow 19, an adjustable calibration rod 20 and a pressure transducer 21. Together, these data collection devices work quantify the amount of ice in the pilot ice tank 11.

Figure 3:
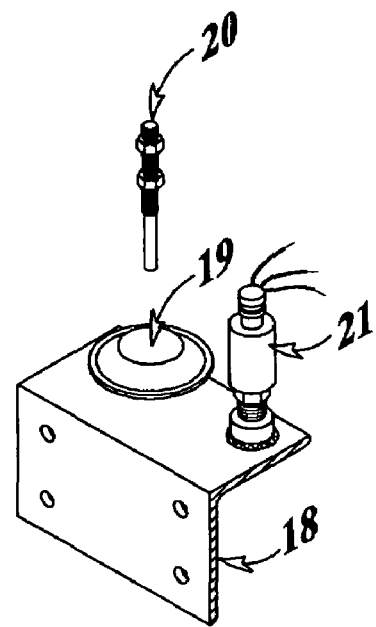
FIG. 3 is a perspective view of the data collecting devices of the present invention.

Referring to FIG. 3, a perspective view of the data collecting devices of the present invention is shown. The devices include a hydraulic bellow support 18 to install the hydraulic bellow 19, or a hydraulic cylinder, an adjustable calibration rod 20 an a pressure transducer 21. The adjustable calibration rod 20 is used to calibrate the system to zero after the heat exchanger inlet and outlet 24 and 25, heat exchanger heads 22 and tubing are filled with the glycol/water solution. The pilot ice tank 11 is then filled with water and the counterweight 17 is secured onto the counterweight arm 38 to keep the pivoting arm 37 in a position parallel to the ground. Once the calibration is complete, the pilot ice tank 11 is ready to operate.

Despite the fact that the pivoting arm 37 and pivoting arm crossbar 15 are part of the invention, there are no moving parts located within the pilot ice tank 11. During operation of the pilot ice tank 11, the resulting force transmitted by the pivoting arm 37 to the adjustable calibration rod 20 is fully applied to the hydraulic bellow 19. The bellow's 19 reaction force keeps the adjustable calibration rod 20 and the pivotal arm 37 motionless. The reaction is produced by the incompressibility of the fluid inside the bellow 19. The effect will be the same as adding weights on top of a table, wherein the table reacting force supports the weights but nothing physically moves.

Figure 4:
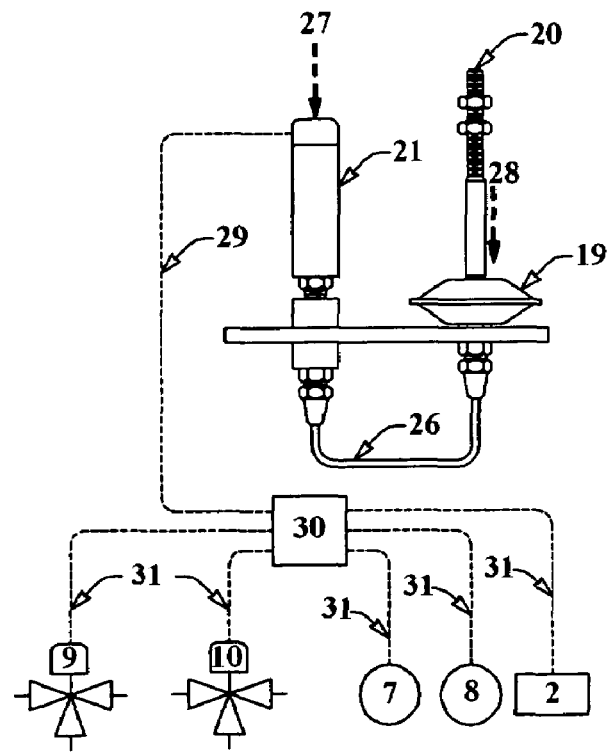
FIG. 4 is a diagram showing the relationship of the data collecting devices of the present invention.

With reference to FIG. 4, a diagram showing the relationship of the data collecting parts of the invention is shown. The hydraulic pressure generated at the hydraulic bellow 19 by the resultant force action 28 applied by the adjustable calibration rod 20 is transmitted through the hydraulic tubing 26 to the pressure transducer 21, which has a electric power source 27. The pressure transducer 21 then converts the pressure signal into a digital electronic signal carried by wires, preferably 10VDC digital signal lines 29, to a central control panel 30 of the TES. Based on the analysis of the information gathered by the pilot ice tank 11, the central control panel 30 sends the electrical/electronic signals through lines, preferably analog/digital communication lines 31, to the chiller and ice tank pumps 7 and 8 and the chiller 2, as well as the three-way bypass valves 9 and 10, to the correct position during the different operating modes of the TES.

Figure 5:
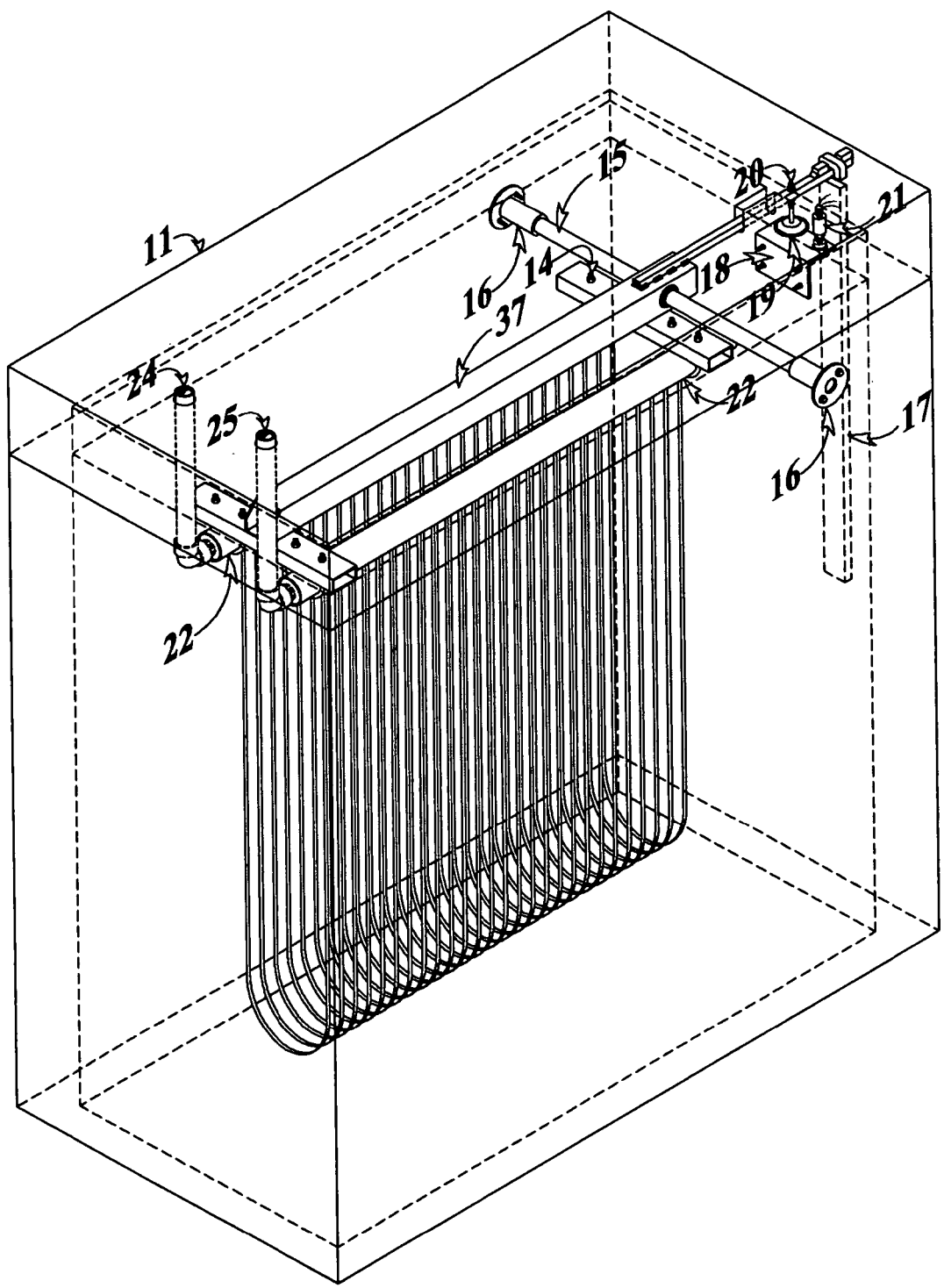
FIG. 5 is a cut-away perspective view of the first embodiment of the present invention.

Finally, FIG. 5 shows a cut-away perspective view of the first embodiment of the present invention. The pivoting arm crossbar 15 is attached to the inside of the pilot ice tank 11 by affixing the pivoting arm crossbar bearings 16 to the inner sides of the pilot ice tank 11. Thus, when ice forms within the tank, the pivoting arm 37 pushes up to produce a resultant force action 28 on the pressure transducer 21, which converts the pressure signal into a digital electronic signal carried by wires, preferably 10VDC digital signal lines 29, to a central control panel 30 of the TES.

Because the solution running through the heat exchanger has a lower freezing point than water during the ice making mode of the TES, any heat contained in the water and air within the pilot ice tank 11 will be absorbed, thereby lowering the temperature of the water within the tank 11 surrounding the heat exchanger coils 23, thus causing ice to form around the heat exchanger coils 23. Since the solution's freezing point is below 32 degrees Fahrenheit, the solution remains unfrozen, thus allowing the solution to continue to travel through the ice tanks 3.

Because ice is less dense than water, the newly formed ice firmly attached to the heat exchanger coils 23 floats, an upward force is exerted on the pivoting arm 37 while the heat exchanger coils 23 are being pushed up. For mathematical purposes, it is conventionally accepted that the resultant upward force will be applied at the center of the pivoting arm 37. The magnitude of the reacting force at the hydraulic bellow 19 will be equal to the product of the magnitude of the force exerted by the ice on the counterweight arm 38, which is attached to pivoting arm 37. The torque produced by such force will be compensated by a reaction force on the hydraulic bellow 19 applied to the counterweight arm 38. The magnitude of the reacting force at the hydraulic bellow 19 will be equal to the product of the magnitude of the force exerted by the ice on the pivoting arm 37 times a ratio of the distances taken from the centers of the forces to the center line of the crossbar of the pivoting arm 15. The ratio of the distances shall be the result of dividing the distance from the center line of the force at the distal end of the pivoting arm 13 by the distance from the center line of the force at the proximal end of the pivoting arm 12 to the center line of the crossbar of the pivoting arm 15.

To use the first embodiment of the present invention, a user must first calibrate the flow of the ice pilot tank 11 to match the ice making/ice melting rate of all existing or new tanks being used for a facility. When calibration is complete, the user is now able to control the entire system by using the ice pilot tank 11.

Contrary to existing thermal energy storage tanks, the use of the present invention will allow for the accurate reading of ice formed within a thermal energy storage tank by measuring and comparing the weight of the ice and of the water displaced by the ice.

It is to be understood that while a certain form of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

We claim:

1. A thermal energy storage tank comprising:
   an insulating tank having a predetermined length, a predetermined width, and a predetermined height;
   said tank having an open top end with a lid and a closed bottom end;
   said tank having four sides;
   a crossbar affixed on two opposing sides across the width of said open top end of said tank;
   a pivoting arm having a proximal end and a distal end said pivoting arm being pivotally affixed to said crossbar at a location between said proximal end and said distal end; and
   a heat exchanger affixed to said pivoting arm wherein said heat exchanger has a solution running therethrough.

2. The thermal energy storage tank of claim 1 wherein: said pivoting arm is pivotally affixed to said cross-bar at said proximal end.

3. The thermal energy storage tank of claim 1 wherein: said distal end of said pivoting arm has a means for securing a counterweight arm.

4. The thermal energy storage tank of claim 3 further comprising a counterweight arm wherein:
said counterweight arm has a means for securing a counterweight.

5. The thermal energy storage tank of claim 3 further comprising a counterweight arm wherein:
an adjustable calibration rod is attached on said counterweight arm; and
said adjustable calibration rod touches a measuring device.

6. The thermal energy storage tank of claim 5 wherein:
said measuring device is a hydraulic bellow.

7. The thermal energy storage tank of claim 5 wherein:
said measuring device is a hydraulic cylinder.

8. The thermal energy storage tank of claim 6 wherein:
said hydraulic bellow is electrically connected to a digital control system.

9. The thermal energy storage tank of claim 7 wherein:
said hydraulic cylinder is electrically connected to a digital control system.

10. The thermal energy storage tank of claim 1 wherein:
said solution is a mixture of water and glycol.

11. The thermal energy storage tank of claim 3 wherein:
said means for securing are bolts.

12. The thermal energy storage tank of claim 3 wherein:
said means for securing are weldments.

* * * * *